March 23, 1937. O. HOFFERBERT 2,074,985

ELECTRIC COOKER

Filed April 30, 1934

Inventor,
Orvin Hofferbert,
George Bayard Jones, Atty.

Witness:
Chas. R. Koursh

Patented Mar. 23, 1937

2,074,985

UNITED STATES PATENT OFFICE 2,074,985

ELECTRIC COOKER

Orrin Hofferbert, Beaver Dam, Wis., assignor to Malleable Iron Range Company, a corporation of Wisconsin Application April 30, 1934, Serial No. 723,196

5 Claims. (Cl. 219—35)

This invention relates to improvements in electric cookers and more particularly to an electric cooker so designed and wired that it may be installed in place of one of the regular heating units in an electric range.

Heretofore, cooker wells, where used with electric ranges, have been designed with heating elements at the bottom. Where the cooker has been designed for table use or as a table appliance, the heating elements have been located at the side thereof. Such table appliance cookers are not adapted to electric range use due to the manner of insulating the heating unit from the cooker, the circuit employed, and the method of connection to the supply circuit. Said table appliances are usually wired for the standard lamp socket voltage and the different degrees of heat are obtained by shifting a suitable plug from one set of contacts to another. The heating element is made up of wires of two different sizes, so connected as to give the heat desired.

On the other hand, the standard wiring used at present for electric ranges conforms to the standard practice of the power companies in which a three wire circuit having a voltage of from two hundred eight to two hundred thirty volts is connected to each heating element or unit. The table appliance cookers cannot be used with these voltages, wired as they are at the present time, as a potential of two hundred volts plus or minus would be impressed between turns of the resistance wire which would cause a flash over or break down between turns or a short circuit to ground, due to the fact that the asbestos insulation absorbs moisture.

The general object of the present invention is to provide an electric cooker for electric ranges which may be substituted for one of the standard heating units therein and which overcomes the above mentioned disadvantages.

Another object is to provide an electric cooker for electric range use adapted to be set in an electric range surface unit top or in some other convenient place for connection with the standard electric range circuit and operated by the standard electric range heating switches so connected as to give high, low, or medium heat.

Another object is to provide a heating element for such cookers, the core of which forms the container for the cooking vessel inserted therein and which vessel contains the food to be cooked.

A further object is to provide a cooking utensil having a resistor or heating wire wrapped around the container, insulated therefrom and imbedded in a high temperature cement to evenly distribute the heat over the container or core.

A further object is to provide a heating element of this character in which the resistance wire is continuous from one terminal to the other, and which has an intermediate connection in the form of a loop of wire carried to a third terminal so as to form a continuous resistor, with no auxiliary electrical connection within the heating element structure or exposed to the heat of the resistor.

Another object is to provide an entire heating unit for a container removable for replacement as a unit.

In the accompanying drawing I have illustrated one embodiment of the invention which will serve to illustrate the advantages heretofore alluded to.

Figure 1:
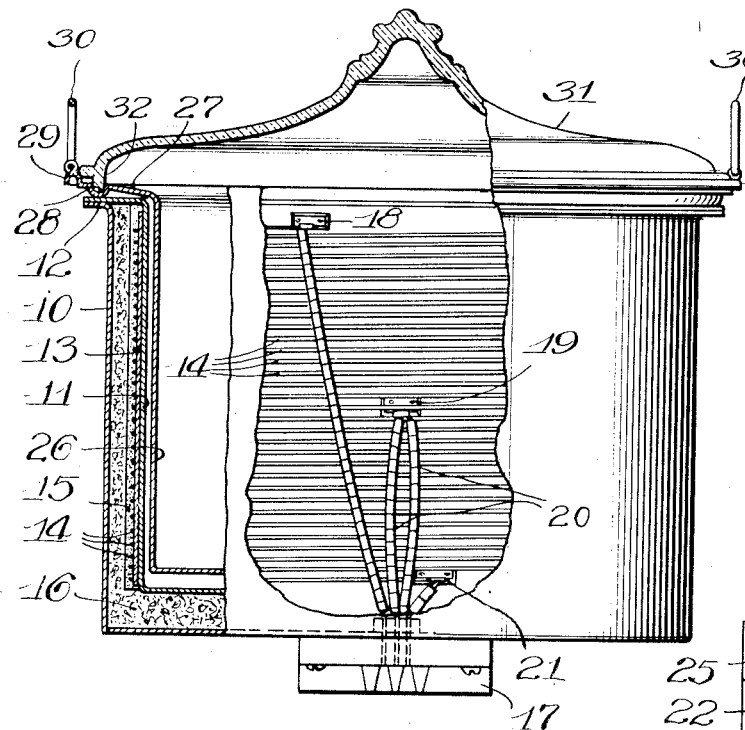
Fig. 1 is an elevation partly in section of a cylindrical cooker.

The cooker comprises an outer shell 10 which may conveniently be of cylindrical shape, as in the preferred form illustrated, although it may be of any desired cross sectional outline. Within it is a steel shell 11 forming a spaced inner wall and constituting also the core on which the resistance wire is wound. The inner shell has an outwardly extending flange 12 which is united to the adjacent flange of the outer shell as by welding or otherwise. Said inner shell is surrounded by mica insulation 13 on which is wound the resistance wire or resistor 14 in a continuous helix except for a loop midway between the ends hereinafter described. The resistance wire is imbedded in a suitable cement 15 adapted to withstand high temperatures and employed also to distribute the heat evenly over the steel shell or core. The space between the outer and inner walls is filled with suitable heat insulating material 16 such as rock wool.

Figure 2:
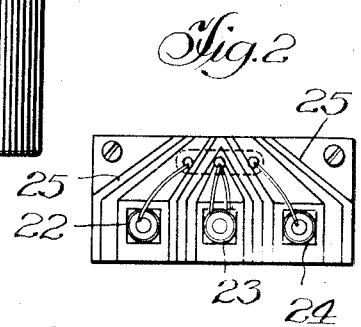
Fig. 2 is a top view of the terminal block beneath the cooker.
Figure 3:
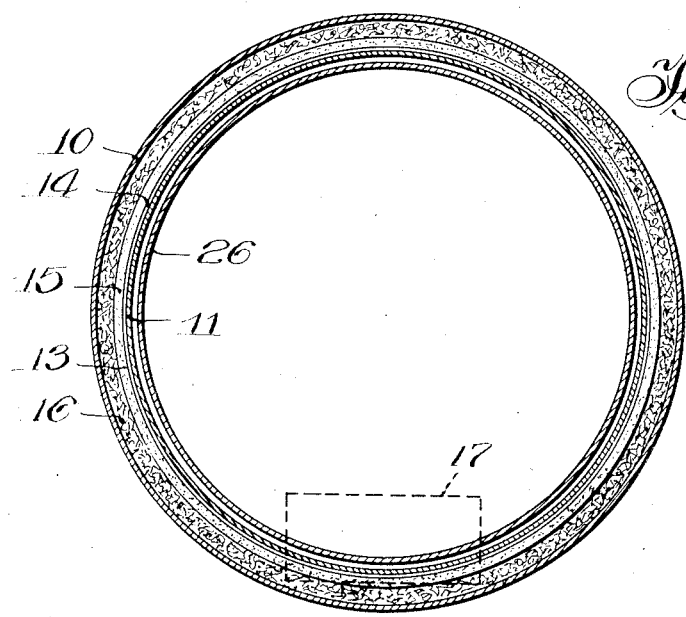
Fig. 3 is a section on the line 3—3 of Fig. 1.

The resistance wire is continuous from the terminal block 17 through the retaining post 18 and around the cylindrical core in helical form to the retaining post 19, at which point a loop 20 is brought out and carried through the center binding post of the terminal block. From the retaining post 19 the resistance wire continues as a helical winding to the retaining post 21 and thence to a third binding post on the terminal block. These three binding posts are indicated as 22, 23 and 24 and are separated by ridges or a barrier of insulating material 25, as shown in Fig. 2.

A cooking vessel or removable insert 26 is supported from above by the outwardly extending flange 27 having a groove 28 therein and a bead 29 at the periphery. It may also be provided with a pair of handles 30. A suitable cover 31 is provided which may, for example, be made of heat resisting glass having a flange 32 fitting within the groove 28.

A cooker having the resistance wire wound and connected in the manner described herein is assured an even distribution of heat applied through the vertical side wall as distinguished from the bottom, and enamel containers may be used without substantial distortion. In addition, various operations may be performed within the cooker not possible with other types of heating devices.

Furthermore, the cooker is so wired that it can replace a regular electric range heating unit by simply taking out the unit and substituting the cooker, after wiring the same, so that the usual electric range switch may be employed. The circuit of the cooker is so arranged that it may be connected to any standard range heater switch intended for the surface units of the range.

Figure 4:
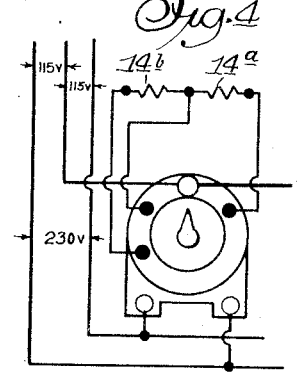
Fig. 4 is a diagram of the circuit connections.

Fig. 4 shows a 3-heat load balanced switch in circuit with the cooker. This switch on "high heat" position connects the cooker heater coils 14a and 14b in series across the 230 volt or high voltage supply of a 3-wire circuit. On medium position, either coil 14a or 14b will be connected to the 115 volt side, (or low side) of the supply circuit. On low heat position of the switch the cooker coils are placed in series across the low side or 115 volt side of the 3-wire supply circuit. The range switch may be of the standard load balanced type or of the neutral connected type.

The cooker may be used with range switches of the series parallel type in which on "High heat position" the coils are placed in multiple across a low or 115 volt supply circuit. On "Medium position" and "Low position", the connection is the same as described with load balanced switches.

The cooker wiring may be changed in resistance to conform to any circuit voltage to which ranges and domestic appliances are connected.

I claim:

1. An electric cooker comprising a double walled heat conducting vessel open at the top and closed at the bottom, with a clearance space between the two walls, mica insulation around the side of the inner wall, a resistance wire of uniform gauge wound over said insulation in a continuous length, a terminal block on said bottom to which the ends of said resistance wire are connected, and a connection from substantially the middle point on said resistance wire to said terminal block to provide two independent resistance sections, one around the upper part and the other around the lower part of said inner wall, whereby said sections may be used either singly or jointly to furnish various degrees of heat and to furnish an even heat when connected in series.

2. An electric cooker comprising a double walled cylindrical vessel of heat conducting material, electrical insulating material around the inner wall only of the same, a resistance wire between said walls wound around the cylindrical inner wall over said insulating material, a terminal block on the bottom of said vessel having three circuit terminals thereon, one end of said wire being connected to one terminal, the other end being connected to another terminal and an intermediate portion of said wire being formed as a loop and connected to the third terminal whereby two independent heating units are formed of a continuous length of resistance wire, and a switch electrically connected to said three terminals to provide a three heat regulation.

3. An electric cooker comprising a cylindrical vessel of enameled steel, mica insulation around the side wall only of the same, a resistance wire wound around said cylindrical vessel over said mica insulation, a terminal block on the bottom of said vessel having three circuit terminals thereon, one end of said wire being connected to one terminal, the other end being connected to another terminal and an intermediate portion of said wire being formed as a loop and connected to the third terminal whereby two independent heating units are formed of a continuous length of resistance wire, and a switch electrically connected to said three terminals to provide a three heat regulation.

4. An electric cooker comprising a cylindrical enameled vessel with an outwardly turned flange at the top, an outer cylindrical wall spaced therefrom and connected at the top to said flange, a resistance wire wound around the inner cylinder, insulating and high temperature resisting cement in which said resistance wire is imbedded, a filler of heat insulating material in the space between said walls and a flanged cooking vessel received within said electric cooker and having an outwardly turned flange at the top resting on said first mentioned flange, whereby heat is supplied to said cooking vessel around the side wall thereof.

5. An electric cooker, for use in an electric range equipped with electric heating units and a three heat load switch for connecting said heating units to a three wire circuit, comprising a heat conducting shell closed at the bottom, thin electrical insulation around the outer side of the wall thereof, a resistance wire of uniform gage throughout, wound helically around the side wall only of said shell over said insulation in a continuous length, an outer shell surrounding said first shell and the resistance wire thereon, a terminal member on the bottom of said outer shell and having thereon three terminals to two of which the ends of said resistance wire are connected, a connection extending between said two shells from substantially the middle of said resistance wire to the third terminal, whereby two sections of substantially the same heating capacity are provided, one of said sections being above the other, and whereby said cooker may be connected interchangeably with one of said range heating units and be controlled by said switch.

ORRIN HOFFERBERT.